UNITED STATES PATENT OFFICE.

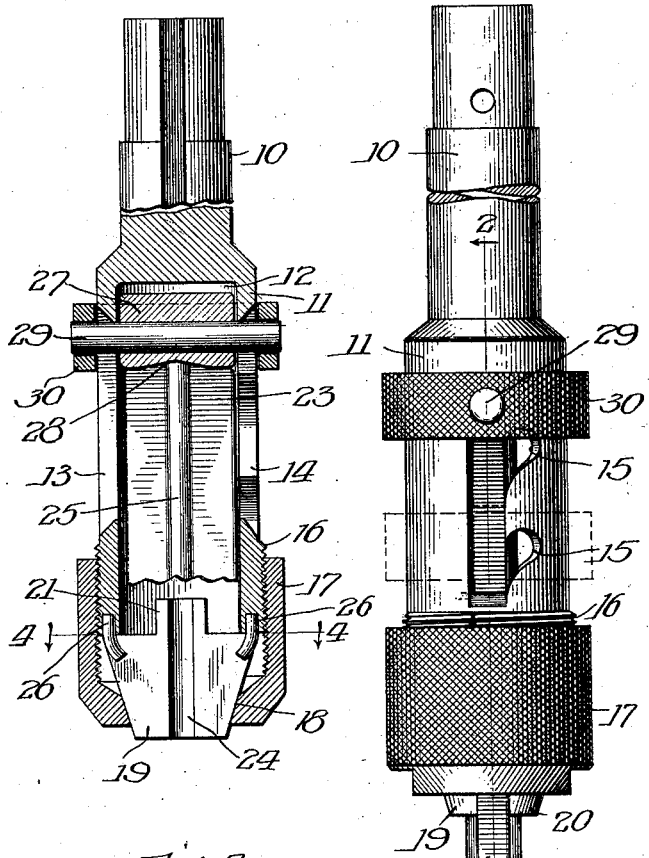
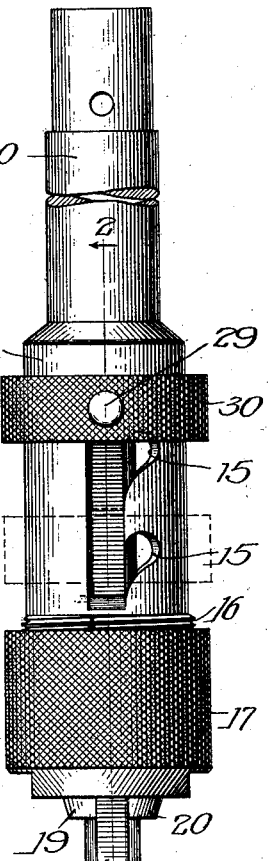
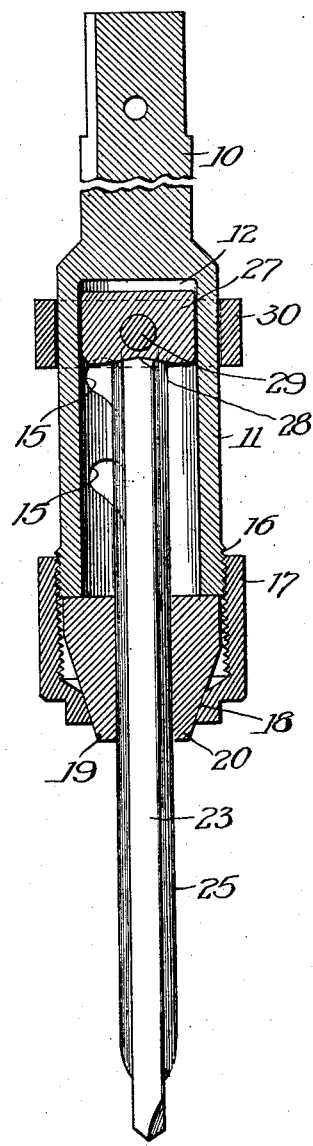
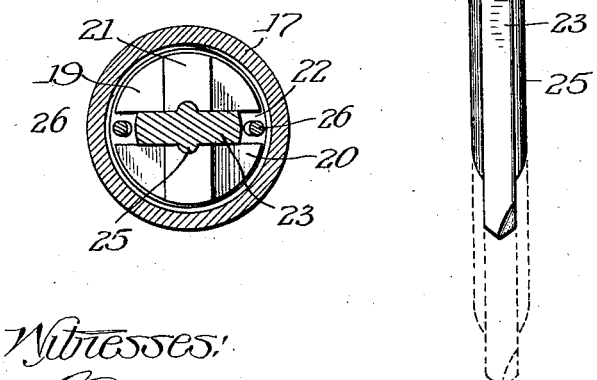

HARRY B. SHREVE, OF CHICAGO, ILLINOIS, ASSIGNOR TO THOMAS H. LOVEJOY, OF CHICAGO, ILLINOIS.

CHUCK.

1,079,520.  Specification of Letters Patent.  Patented Nov. 25, 1913.

Application filed May 17, 1912. Serial No. 697,858.

*To all whom it may concern:*

Be it known that I, HARRY B. SHREVE, a citizen of the United States, residing at Chicago, in the county of Cook and State of Illinois, have invented certain new and useful Improvements in Chucks, of which the following is a specification.

This invention relates to chucks for drills and analogous tools, and has for its primary object the adaptation of the chuck to the holding firmly of tools in position to project at greater or less distances from the chuck and to hold tools of varying length in such manner as to project to a substantially uniform extent.

Having this primary object in view, as well as certain other minor objects, as will hereinafter appear, the invention consists in the novel features of construction and combination of parts hereinafter particularly claimed, and which will now be described in detail, having reference to the accompanying drawing, wherein is illustrated a preferred embodiment of the invention, and wherein,—

Figure 1 is an elevation of my improved chuck; Fig. 2 is a vertical section on the line 2—2 of Fig. 1; Fig. 3 is a similar section taken at right angles to that shown in Fig. 2; and Fig. 4 is a horizontal section on the line 4—4 of Fig. 2.

In the drawings, 10 designates the shank of a chuck having a head 11 formed integral therewith and provided with an axial bore 12, and in its side walls with opposed longitudinal slots 13 and 14. Each of these slots is provided along one of its side walls with inclined recesses 15, the side walls of which extend helically with reference to the head, while the bottom of the recess is curved, as shown in Fig. 1. The recesses formed in the wall of the slot 13 are upon the opposite side of the slot from those in the wall of the slot 14, so that the recesses, similarly to the slots, are diametrically arranged opposite each other and in transverse alinement. Each slot may be provided with any desired number of recesses, there being two shown in the present case.

The head is exteriorly threaded at its lower portion, as shown at 16, for the reception of the usual interiorly threaded cap 17, which is inwardly coned at 18 to coact in the usual manner with the outer inclined faces of the tool-receiving jaws 19—20.

Each of the jaws is provided on its rear face with a projection 21 fitting within a slot 22 in the outer end of the head, whereby the jaw is guided for transverse movement relative to the head to engage one jaw upon each side of a tool 23. The opposed side faces of the jaws are also provided preferably with vertical grooves 24 adapted to receive a rib 25 formed upon the side of the tool to facilitate the firm positioning of the tool between the jaws. In order to limit the inward movement of the jaw members when no tool is within the chuck, the lower face of the tool head is provided with studs 26 projecting therefrom, and preferably bent inwardly, as shown in Fig. 2, to form an abutment for the opposed lateral faces of the jaw members, each member being confined between the inner wall of the cap 17 upon the one hand and the studs on the other, so that at all times the jaws are held apart to facilitate the entrance of a tool therebetween.

With metal-working tools of this character the machinist finds it necessary to frequently resharpen the same, and the sharpening operation necessarily reduces the effective length of the drill, so that, with the ordinary chuck, the drill must be discarded when it has decreased in length to such an extent that the working point of the same projects but slightly beyond the head. This is disadvantageous, not only from the standpoint of the expense incident to the discarding of such shortened tools, but it is also desirable in many classes of work to have the tool project a substantially uniform distance from the chuck, and in other cases to have the tool project a considerable distance in order to reach into confined spaces. To meet these conditions, the drill is at times not seated entirely within the head so as to abut against the inner end of the same, depending upon the clamping action of the jaws to hold the drill in this position. It is, however, exceedingly difficult, if not impossible, to hold the tool rigidly under such circumstances. It has been proposed to provide an adjustable stop or abutment for the inner end of the tool, but the difficulty of obtaining access to and adjusting such stop has prevented the general adoption of such devices. In the present case, I provide such as abutment, which is adjustable instantaneously without the removal of the jaws or the tool, the constructional details of the embodiment of my invention shown being as follows:

Within the bore of the head is mounted for slidable movement a stop 27, which is cylindrical in cross section and has a concave front face 28. This stop is transfixed laterally by a pin 29 firmly seated therein and projecting laterally therefrom into the slots 13 and 14, by which the stop is guided for longitudinal movement within the head. The outer ends of the pin are mounted within a sleeve 30, by means of which the stop may be moved longitudinally, and also rotated in order to enter the two end portions of the pin within the spaced recesses 15.

In the most retracted position of the stop and tool, the pin bears against the walls of the rear ends of the slots, while the rear end of the tool 23 is slightly tapered to fit within and bear against the concave front face 28 of the stop, whereby the rear end of the tool is centered and also held firmly against rearward movement, while the medial portion of the tool is clamped between the jaw members with its rib 25 in the groove 24.

The effective length of the drill may be increased or the outer end of the drill held in substantially uniform relation to the chuck after repeated sharpening operations by merely loosening the cap 17 slightly to release the tool, then drawing the stop 27 outwardly by means of the sleeve 30, and then slightly rotating the latter to seat the pin 29 within one pair of opposed recesses 15. Clamping of the jaws upon the drill by means of the cap 17 prevents the pin 29 from leaving the recesses 15; and the lower walls of the recess serve as a support for the pin and constitute with the stop 27 a firm rearward abutment for the tool.

It will be apparent that the stop may be adjusted to a greater or less degree longitudinally of the head by bringing the same into engagement with other recesses as occasion may require.

While I have herein resorted to a considerable degree of particularity in illustration and description in order that the invention might be readily understood as thus embodied in a preferred form, the invention is not to be limited or restricted to the precise features of construction so illustrated and described, as the constructional details may be modified within comparatively wide limits without departure from the substance of the invention as set forth in the claims or the sacrifice of its substantial benefits and advantages.

I claim:

1. In a chuck, the combination of an axially-bored head, a stop mounted for reciprocatory axial movement within the bore of the head, means to lock the stop at spaced intervals, and means exterior to and reciprocable axially of the head whereby to position the stop and operate the locking means, substantially as described.

2. In a chuck, the combination of an axially-bored head having slotted side walls, one side of the slot provided with recesses, a stop mounted for axial movement within the bore of the head and having laterally extending pins guided in the slot and adapted to enter the recesses, and means exterior to the head whereby to position the stop in the recesses, substantially as described.

3. In a chuck, the combination of an axially-bored head having slotted side walls, one side of each slot provided with inclined recesses, a stop mounted for axial movement within the bore of the head and having laterally extending pins guided in the slots and adapted to enter the recesses, a sleeve surrounding the head and connected to the pins whereby to move the stop axially and to bring the same into locking relation with one of the recesses, tool-receiving jaws laterally adjustable on the head and providing therebetween a passageway in line with the stop, and means to clamp the jaws upon a tool, substantially as described.

4. In a chuck, the combination of an axially-bored head having in its walls diametrically opposed slots, one side of each slot provided with inclined recesses, the recesses of one slot diametrically disposed in alinement with the recesses of the other slot, a stop provided in its front face with means for centering a tool, said stop mounted for axial movement within the bore of the head and having laterally extending pins guided in the slots and adapted to enter the recesses, a sleeve surrounding the head and connected to the pins whereby to move the stop axially and to bring the same into locking relation with one of the recesses, tool-receiving jaws laterally adjustable on the head and providing therebetween a passageway in line with the stop, and means to clamp the jaws upon a tool, substantially as described.

5. In a chuck, the combination of a head, tool-receiving jaws adjustable laterally on the head, studs projecting from the head between the jaw members to limit their inward movement, and a cap to embrace the jaws to limit their outward movement and to clamp the same upon a tool, substantially as described.

6. In a chuck, the combination of a head provided in its end face with transversely-extending slots, tool-receiving jaws having projections guided within the slots, studs projecting from the head between the jaws to limit their inward movement, and a cap disposed upon the head over the jaws whereby to limit their outward movement and to clamp the same inwardly upon a tool, substantially as described.

7. In a chuck, the combination of an exteriorly threaded head having in its outer end face transverse slots, frusto-conical tool-receiving jaw members provided with projections guided within the slots, studs projecting from the head between the jaws to limit their inward movement, and an inwardly-coned cap threaded upon the head and confining the jaws whereby to clamp the same upon a tool, substantially as described.

8. In a chuck, the combination of an axially-bored head having in its walls diametrically opposed longitudinal slots, one side of each slot provided with inclined recesses, a stop having a concave front face mounted for axial movement within the bore of the head and having laterally extending pins guided in the slots and adapted to enter the recesses, a sleeve surrounding the head and connected to the pins, said sleeve adapted for movement axially in a right line and also obliquely, whereby to move the stop axially and to bring the same into locking relation with one of the recesses, tool-receiving jaws laterally adjustable on the head and providing therebetween a passageway in line with the stop, and means to clamp the jaws upon a tool, substantially as described.

9. In a chuck, the combination of an axially-bored head having in its walls diametrically opposed longitudinal slots, one side of each slot provided with inclined recesses, a stop having a concave front face mounted for axial movement within the bore of the head and having laterally extending pins guided in the slots and adapted to enter the recesses, a sleeve surrounding the head and connected to the pins whereby to move the stop axially and to bring the same into locking relation with one of the recesses, the outer end face of the head provided with diametrically disposed slots, tool-receiving jaws having projections taking into the slots and guided therein for lateral adjustment, means to limit the inward movement of the jaws, and means to limit their outward movement and to clamp the same upon a tool, substantially as described.

HARRY B. SHREVE.

Witnesses:
JENNIE GUNNING,
JESSIE E. FOWLER.

Copies of this patent may be obtained for five cents each, by addressing the "Commissioner of Patents, Washington, D. C."